United States Patent [19]
De Wit et al.

[11] Patent Number: 6,016,261
[45] Date of Patent: Jan. 18, 2000

[54] SWITCHING VOLTAGE CONVERTER WITH SYNCHRONOUS RECTIFICATION

[75] Inventors: Johannes De Wit; Wilhelmus G. M. Ettes; Roelf Van Der Wal; Jacob H. Botma, all of Drachten, Netherlands

[73] Assignee: U.S. Philips Corporation, New York, N.Y.

[21] Appl. No.: 09/240,815

[22] Filed: Feb. 1, 1999

[30] Foreign Application Priority Data

Feb. 3, 1998 [EP] European Pat. Off. ............. 98200306

[51] Int. Cl.[7] .................................................. H02M 3/335
[52] U.S. Cl. ............................................................. 363/21
[58] Field of Search .................. 363/20, 21, 95, 363/97, 131

[56] References Cited

U.S. PATENT DOCUMENTS

| | | | |
|---|---|---|---|
| 4,870,555 | 9/1989 | White | 363/21 |
| 5,099,406 | 3/1992 | Harada et al. | 363/20 |
| 5,412,555 | 5/1995 | Uramoto | 363/18 |
| 5,768,118 | 6/1998 | Faulk et al. | 363/72 |
| 5,781,420 | 7/1998 | Xia et al. | 363/21 |
| 5,859,524 | 1/1999 | Ettes | 363/132 |

FOREIGN PATENT DOCUMENTS

| | | | |
|---|---|---|---|
| 0464246A1 | 1/1990 | European Pat. Off. | H02M 3/335 |
| 0549920A1 | 7/1993 | European Pat. Off. | H02M 3/335 |
| 9508863 | 3/1995 | WIPO | H02M 3/335 |

*Primary Examiner*—Matthew Nguyen
*Attorney, Agent, or Firm*—Ernestine C. Bartlett

[57] ABSTRACT

A switching power supply with synchronous rectification by means of a diode and a parallel-connected electronic switch. By means of a one-shot circuit the electronic switch is driven into conduction during a fixed portion of the time period during which the diode would be conductive without the electronic switch.

8 Claims, 5 Drawing Sheets

SWITCHING VOLTAGE CONVERTER WITH SYNCHRONOUS RECTIFICATION

BACKGROUND OF THE INVENTION

The invention relates to a switched-mode power supply comprising: an inductive element; a first electronic switch, coupled to the inductive element so as to cause current to flow through the inductive element during an on period in which the first electronic switch is conductive; and a parallel arrangement of a diode and a second electronic switch, also coupled to the inductive element so as to cause current to flow through the inductive element during an off period in which the first electronic switch is not conductive.

Such a switched-mode power supply is known, inter alia from International Application (PCT) No. WO 95/08863. Said known switched-mode power supply is of the flyback type, the inductive element being a transformer having a primary winding, which is connected to an input voltage during the on period and which is disconnected therefrom during the off period by means of the first electronic switch, and having a secondary winding, which powers a load via the diode and the second electronic switch which is arranged in parallel with said diode. When the first electronic switch is switched to the off state, i.e. during the off period, the diode is turned on by the voltage in the secondary winding and the magnetic energy built up in the transformer is supplied to the load.

When the output voltage across the load is comparatively small the voltage drop across the diode is comparatively large, as a result of which the efficiency of the power supply is reduced. The efficiency also diminishes for large currents through the load on account of the heat dissipation in the diode. In order to cope with this, it is known, inter alia from said International Application, to replace the diode by a second electronic switch, generally in the form of a MOSFET having a low forward resistance. This second electronic switch is turned on at the instants that the diode is turned on and is turned off at the instants that the diode is turned off. For safety reasons or for simplicity the diode is often not replaced by an electronic switch but the second electronic switch is arranged in parallel with the diode. In the case of a MOSFET the diode is often present anyway in the form of a body diode. The control of the second electronic switch requires a critical timing. For example, the second electronic switch should not be turned on until the first electronic switch has been turned off. If this is not the case, substantial switching losses may occur.

The second electronic switch can be controlled directly by means of a control signal which is in a fixed time relationship to the control signal of the first electronic switch. The known switched-mode power supply is an example of this. The control signals for the two electronic switches are the inverse of one another, fixed delay times being adopted to preclude overlapping of switching edges.

U.S. Pat. No. 4,870,555 discloses a forward converter in which the inductive element is connected between a voltage source and a load via an isolating transformer during the on period. In the off period the current flows through a synchronous rectifier. Said configuration requires two first electronic switches, one in series with the primary winding and one in series with the secondary winding, which should be driven simultaneously. The second electronic switch in the synchronous rectifier is controlled in phase opposition to the first electronic switches. A special logic circuit with cross-coupled NOR gates serves to prevent the second electronic switch from being activated prematurely.

European Patent Application EP 0,549,920 discloses still other configurations of switched-mode power supplies, in which the electronic switches in the synchronous rectifiers are driven into conduction briefly after the turn-on of the diodes arranged in parallel with these switches and are cut off briefly before the turn-off of the diodes. This requires a complex timing and control circuit.

Alternatively, the second electronic switch can be controlled indirectly by monitoring the voltage across and/or the current through the second electronic switch, a reversal of the sign of the voltage or the fact that a given current is reached being the indication to turn on or turn off the electronic switch. All these known control methods have the drawback that they require complex circuits and that their timing is critical.

SUMMARY OF THE INVENTION

Consequently, there is a need for none too critical and simple switched-mode power supplies with synchronous rectification. The invention provides a switched-mode power supply of the type defined in the opening paragraph, which is characterized in that the switched-mode power supply includes means for turning off the second electronic switch in the off period during a fixed activation time having a length which is smaller than and is independent of the length of the off period.

The complex timing problem is circumvented by not making the second electronic switch conductive as long as possible during the off period but only for a predetermined fixed time. The second electronic switch is already turned off amply before the instant at which the current through the diode passes through zero and the diode would be cut off. This turn-off method is not critical at all provided that it is effected in due time. After the second electronic switch has been turned off the diode arranged in parallel with this switch takes over the current until the current passes through zero. Thus, a residual span of time within the off period is left, in which the diode is not short-circuited by the second electronic switch. However, within the off period the current through the electronic switch decreases substantially linearly. During this residual span the current and, consequently, the losses are relatively minimal.

To apply the fixed activation time the length of the off period must be known in advance. This is the case in switched-mode power supplies having a fixed switching frequency or a fixed off period. However, also in the case of a variable frequency and off period the fixed activation time can be applied, provided that it is chosen so as to be short enough to lie within the off period under all conditions. However, in that case the efficiency gain is not constant. If desired the length of the fixed off period can be made dependent on the operating conditions of the switched-mode power supply.

The invention is particularly suited in a so-called Self Oscillating Power Supply (SOPS) of the flyback type having a transformer. In this type of power supply a voltage transient is produced when the current through the diode in series with the secondary winding ceases, which voltage transient is fed back in order to turn on the first electronic switch. This voltage transient defines the end of the off period. If the diode is now replaced by a MOSFET, said voltage transient is no longer available. As a matter of fact, without any further measures the MOSFET remains conductive when the current passes through zero and its sign changes. However, as a result of the use of the fixed activation time the voltage transient remains available and no further measures need to be taken in order to ensure the correct operation of the power supply.

The fixed activation time of the second electronic switch can be provided by a one-shot circuit which is triggered by a signal which indicates the end of the on period.

Europäische Patentanmeldung EP 0 464 246 discloses a flyback SOPS having a transformer and a parallel arrangement of a diode and a MOSFET in the secondary circuit. After expiry of the off period the MOSFET is kept in the on state for a fixed time in order to assure that the switching frequency in the zero-load condition does not become too high. This fixed time does not fall within the off period but after the off period.

U.S. Pat. No. 5,412,555 also discloses a flyback converter having a transformer and a parallel arrangement of a diode and a second electronic switch in the secondary circuit. A binary signal indicates whether or not there is a current through the diode. The leading and trailing edges of this signal are delayed by a fixed time. The delayed signal turns on and turns off the second electronic switch. The fixed delay time of the trailing edge does not appear within the off period but after the off period and, just as in said Europäische Patentanmeldung EP 0 464 246, serves to ensure that the switching frequency in the zero-load condition does not become too high.

The invention is suitable for all kinds of configurations of switched-mode power supplies with synchronous rectification, such as the buck converter, forward converter, buck-boost converter with or without isolating transformer in a variety of electrical appliances, for example rechargeable shavers, toothbrushes, telecommunication equipment, video equipment, audio equipment and computer equipment.

These and other aspects of the invention will be described and elucidated with reference to the accompanying drawings, in which:

BRIEF DESCRIPTION OF THE DRAWINGS

In these Figures parts having a like function or purpose bear the same reference numerals.

DESCRIPTION OF THE PREFERRED EMBODIMENTS

Figure 1:
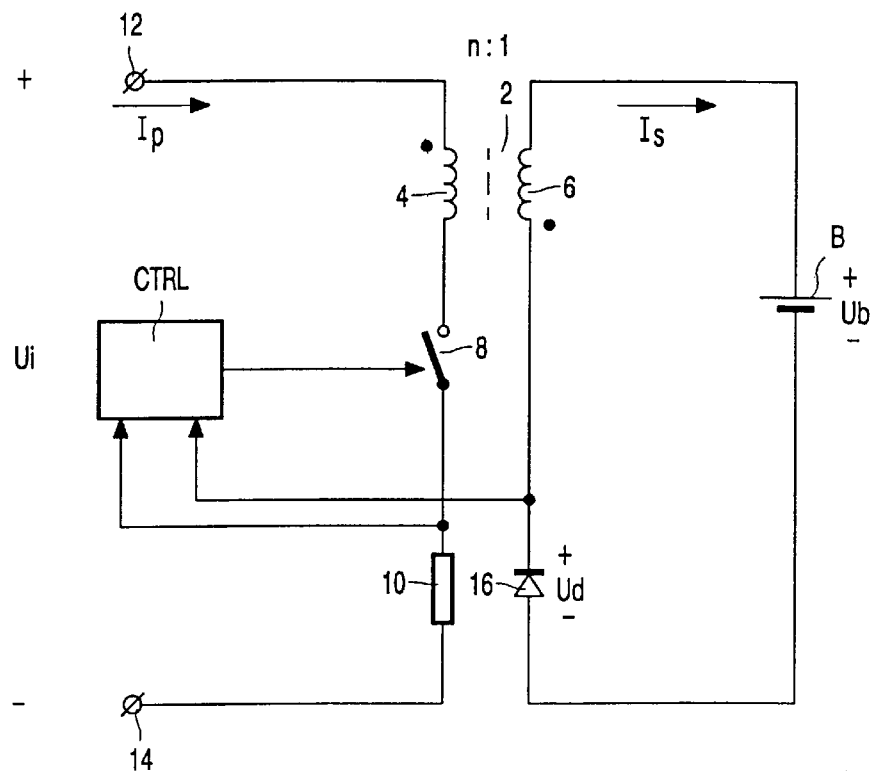
FIG. 1 shows the topology of a Self Oscillating Power Supply.

FIG. 1, by way of example, shows the topology of a Self Oscillating Power Supply (SOPS) to which the principles of the present invention can be applied. However, the principles can also be applied to other types of switched-mode power supplies, as will be illustrated by means of an example hereinafter. The power supply has a transformer 2 comprising a primary winding 4 and a secondary winding 6, which have a turns ratio n:1 and whose winding direction is indicated by means of a dot. The primary winding 4 is connected to a first supply terminal 12 and a second supply terminal 14, to which a direct voltage Ui is applied, via an electronic switch 8 and a sensing resistor 10. The secondary winding 6 is connected to a load to be powered via a diode 16, which load is, by way of example, a rechargeable battery B. The electronic switch 8 is controlled by a control block CTRL.

Figure 2A:
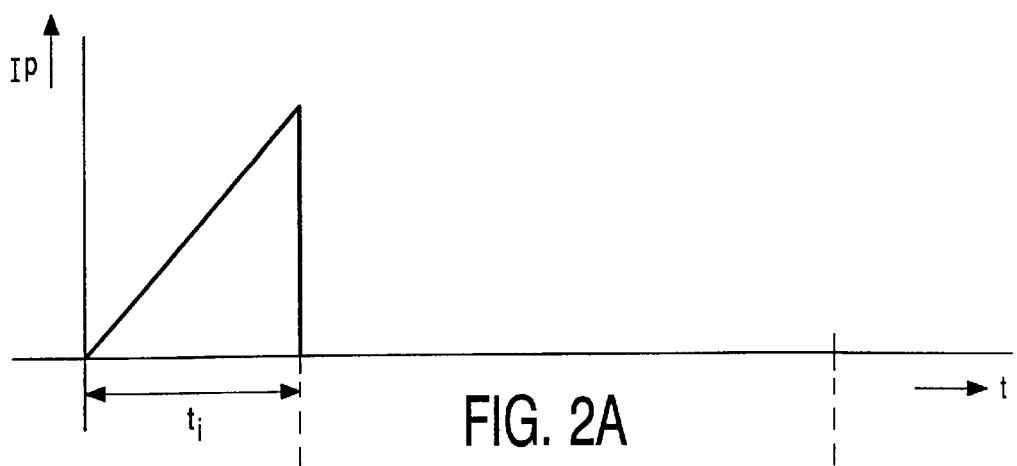
FIG. 2A, FIG. 2B and FIG. 2C shows some signal waveforms which are characteristic of the power supply of FIG. 1.
Figure 2B:
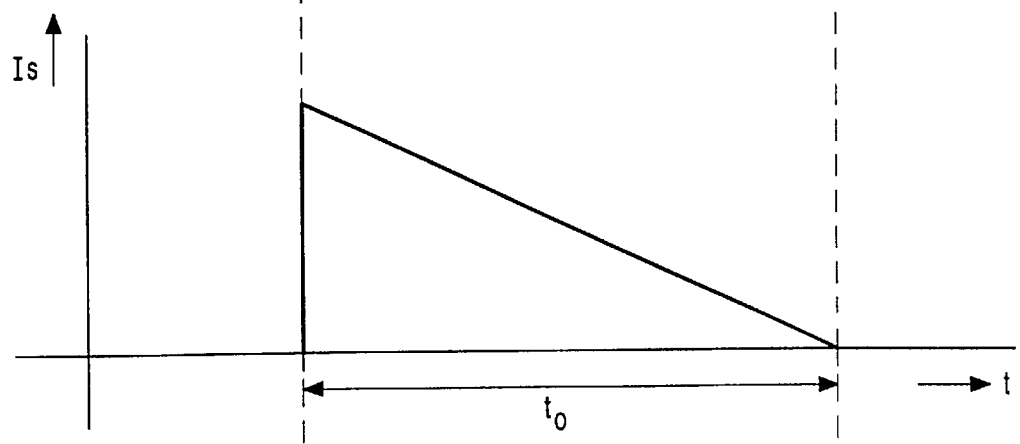
Figure 2C:
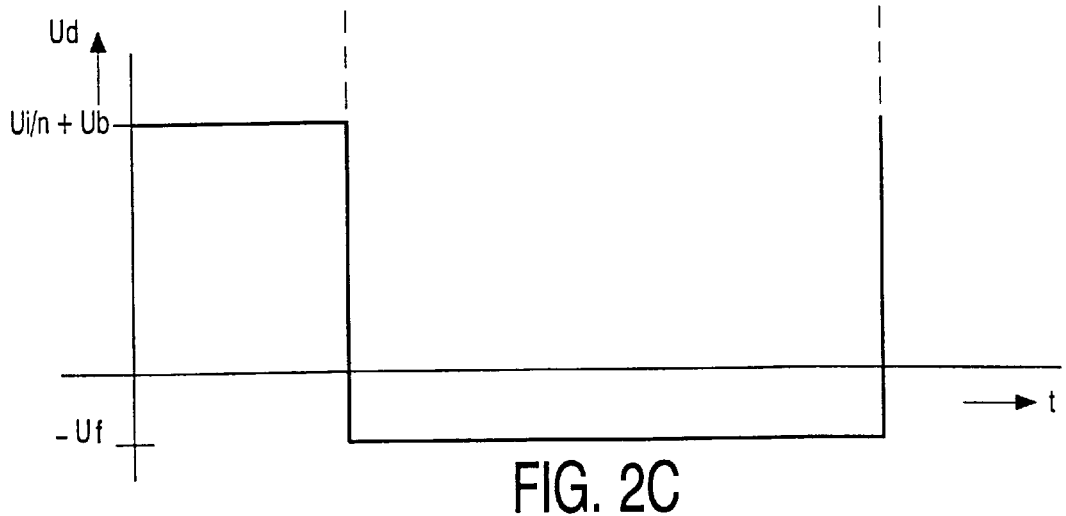

The power supply operates as follows. At the beginning of a cycle the electronic switch 8 is closed. The direct voltage Ui appears across the primary winding 4. Now a linearly increasing current Ip starts to flow through the primary winding 4 during an on period $t_i$, as illustrated in FIG. 2A. The primary current Ip produces an increasing voltage across the sensing resistor 10, which voltage is measured by the control block CTRL. When the increasing voltage exceeds a given threshold, i.e. at a given peak value of the primary current Ip, the control block CTRL again opens the electronic switch 8. During the on period, also called the primary interval, a voltage Ui/n appears across the secondary winding. The diode 16 is poled in such a manner that no secondary current Is flows through the secondary winding 6. The total voltage across the diode 16 is represented in FIG. 2C and is equal to Ui/n+Ub during the on period $t_i$, where Ub is the voltage across the battery B. After the electronic switch 8 has been opened the voltages across the windings of the transformer 2 are reversed and a secondary current Is begins to flow through the diode 16 and the battery B. The voltage Ud across the diode 16 is now equal to the forward voltage drop Uf. The secondary current Is decreases linearly during the off period $t_o$, as is shown in FIG. 2B. As soon as the secondary current Is becomes zero the diode 16 is cut off, as a result of which the diode voltage Ud increases again. This voltage increase is an indication for the control block CTRL to close the electronic switch 8 again, after which a new cycle begins.

The voltage drop Uf across the diode 16 is approximately 0.7 V. This is no longer negligible with respect to battery voltages of a few volts. Since the charging currents can be substantial comparatively large losses arise in the diode 16. These losses are avoided by replacing the diode 16 by a synchronous rectifier having a low internal resistance. The synchronous rectifier is essentially a transistor switch having a low internal resistance, generally a MOSFET, which performs the function of the diode. The transistor switch is turned on at the instant at which the diode would become conductive and is turned off at the instant at which the diode would be cut off again. Owing to the smaller voltage drop across the transistor switch the losses are smaller than in the case that a diode is used. Theoretically, the losses are minimal when the secondary current flows wholly through the transistor switch and never through a diode.

However, in practice, controlling the transistor switch is rather difficult, particularly its timing. For safety reasons the diode is generally kept and the transistor switch is connected in parallel with the diode. If the transistor switch fails, then there is always the diode to guarantee the correct operation. If the transistor switch is a MOSFET, the internal body diode of the MOSFET functions as the rectifier diode and the external diode may be dispensed with.

The electronic switch in parallel with the diode 16 should be turned on as rapidly as possible after the beginning of the off period to, preferably briefly after the electronic switch 8 has been turned off. In practice, it is comparatively simple to obtain a signal suitable for this purpose. The negative-going edge in the voltage Ud (see FIG. 2C) is such a signal. It is more difficult to detect the instant at which the current through the diode 16b becomes zero. When a conductive MOSFET is arranged in parallel with the diode 16, the voltage across the parallel arrangement of the diode and MOSFET will no longer exhibit any transients when the secondary current Is passes through zero. It is yet possible to detect the zero crossing by monitoring the current through the MOSFET. In other configurations than the flyback SOPS it is possible to revert to a more accurately timed direct control of the electronic switch in the primary circuit and the synchronous diode in the secondary circuit, care being taken that the switching times do not overlap one another.

Figure 3:
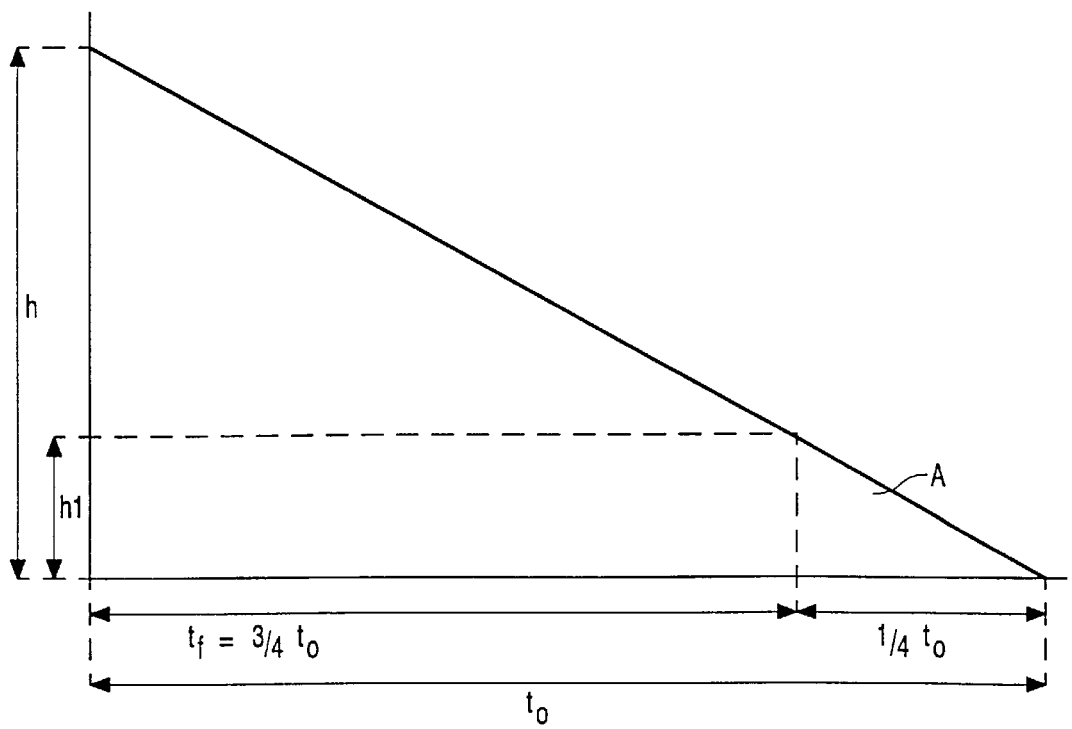
FIG. 3 shows a more detailed waveform diagram of the signal of FIG. 2B.

In accordance with the invention the electronic switch in parallel with the diode 16 is turned off a fixed interval after the beginning of the off period $t_o$, but before the secondary current Is passes through zero. The secondary current Is thus flows through the electronic switch during a fixed portion of the off period $t_o$ and through the diode 16 for the remainder of this period. As a result of this, the losses will increase as compared with what is theoretically attainable but this increase is not significant. FIG. 3 again shows the decreasing secondary current Is. In the off period $t_o$ the current decreases from a value h to the value zero. The off period $t_o$ has been divided so that it comprises a fixed activation time $t_f$, which has been chosen to be equal to, for example, ¾ of $t_o$. In the interval $t_f$ the current decreases from h to h1. In the residual time, ¼ of $t_o$, the current decreases from h1 to zero. The losses in the diode 16 are proportional to the area of the triangle of which one side represents the current decrease and of which another side represents the time elapsed during this current decrease. Since h1=¼h, the area of the triangle A is 1/16 of the total area. This means that in the time ¼$t_o$ only approximately 6% of the losses occurs in the time ¼$t_o$. By activating the electronic switch for only 75% of the off period approximately 94% of the attainable gain is obtained.

In order to determine the fixed activation time $t_f$ it must be known how long the off period $t_o$ is. In switched-mode power supplies with a fixed frequency or a fixed off period this is known, but if this is not the case the fixed activation time can be chosen so short that the electronic switch is turned off before the end of the off period under all conditions.

Figure 4:
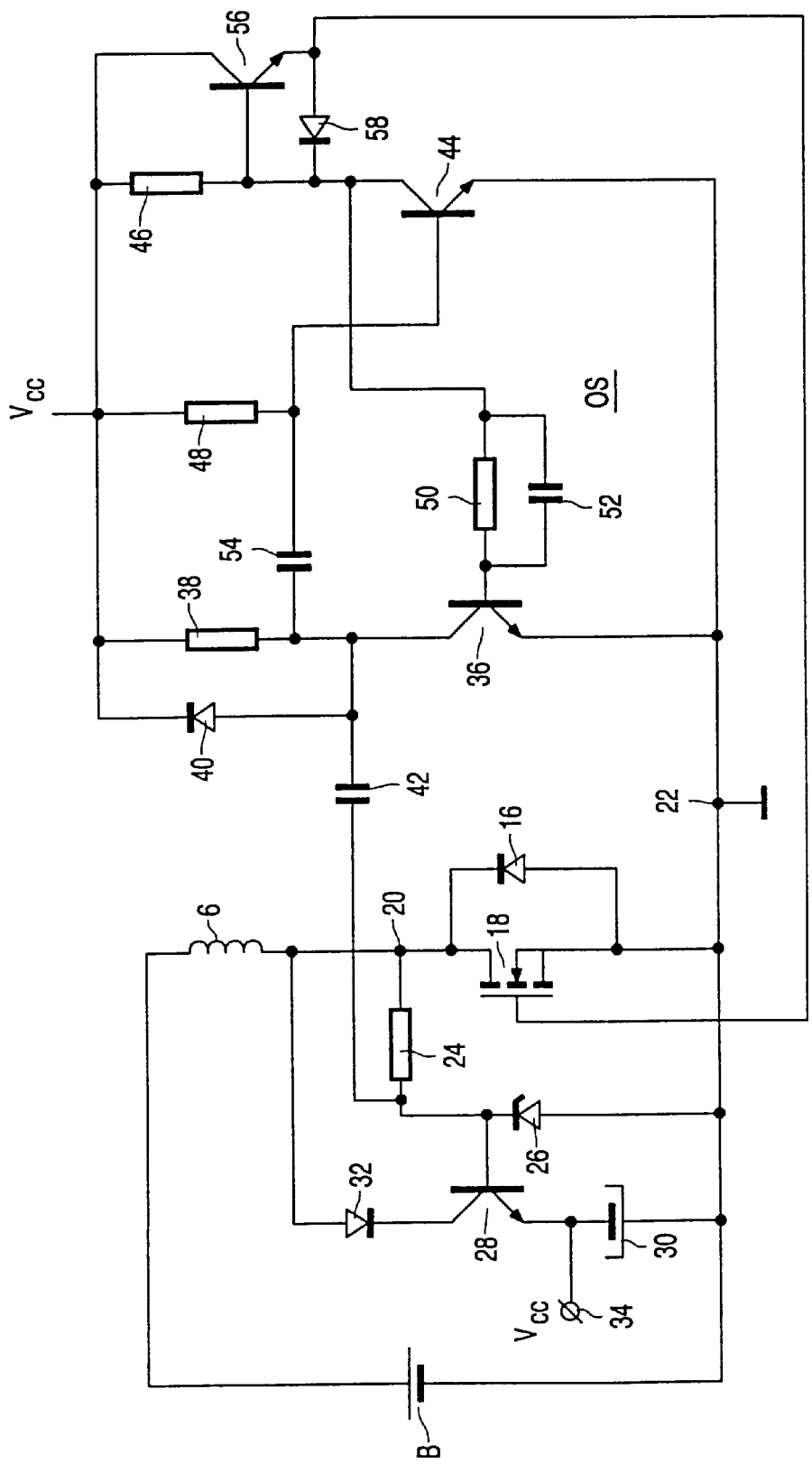
FIG. 4 is a circuit diagram of a one-shot circuit for use in the power supply of FIG. 1.

FIG. 4 shows a more detailed diagram of the secondary circuit of the circuit arrangement shown in FIG. 1, the diode 16 being bypassed with a MOSFET 18 whose gate is driven by a one-shot OS. The alternating voltage on the node 20 between the secondary winding 6 and the diode 16 is used for triggering the one-shot OS and also for generating a supply voltage Vcc for the one-shot OS. The signal waveform of the alternating voltage on the node 20 is approximately as shown in FIG. 2C, the node between the battery B and the diode 16 being connected to signal ground 22. The positive voltage on the node 20 is limited by means of a resistor 24 and a zener diode 26 connected in series between the node 20 and ground 22. The limited positive voltage transients across the zener diode 26 are rectified by means of a NPN transistor 28 and a capacitor 30. The base of the transistor 28 is connected to the node between the resistor 24 and the zener diode 26. The capacitor 30 is connected between the emitter of the transistor 28 and ground 22. The voltage Vcc across the capacitor 30 serves as a supply voltage and is available on a supply terminal 34. The collector of the transistor 28 is connected to the node 20 via a diode 32. This diode 32 prevents the transistor 28 from being turned on when the voltage on the node is negative with respect to ground 22. The present circuit for generating the supply voltage Vcc is stable and hardly dependent on the direct voltage Ui across the primary winding. This results in a constant voltage for driving the gate of the MOSFET 18, which leads to a constant ON resistance of the MOSFET 18.

The one-shot OS comprises an NPN transistor 36 having its emitter connected to ground 22. The collector of the transistor 36 is connected to the supply terminal 34 via a resistor 38 and a diode 40 arranged in parallel with this resistor. A capacitor 42 is connected between the collector of the transistor 36 and the node between the zener diode 26 and the resistor 24. The one-shot OS further comprises an NPN transistor 44 having its emitter connected to ground 22, having its collector connected to the supply terminal 34 via a resistor 46, and having its base connected to the supply terminal 34 via a resistor 48. The base of the transistor 36 is connected to the collector of the transistor 44 via a resistor 50 and a speed-up capacitor 52 arranged in parallel with this resistor. The base of the transistor 44 is connected to the collector of the transistor 36 via a capacitor 54. Furthermore, the collector of the transistor 44 is connected to the base of an NPN transistor 56 having its collector connected to the supply terminal 34 and having its emitter connected to the gate of the MOSFET 18. A diode 58 in anti-parallel with the base-emitter junction of the transistor 56 protects this junction from breaking down in the case of negative-going signal transients on the base of the transistor 56.

The one-shot OS is edge-triggered and not voltage-triggered. This prevents the one-shot from being retriggered by the voltage transient as a result of the turn-off of the MOSFET 18 and the take-over of the current by the diode 16. During the on period $t_i$ the one-shot OS is at rest, the transistor 44 being conductive because its base voltage is positive via the resistor 48 and the transistor 36 being non-conductive because its base voltage is substantially equal to ground potential owing to the conduction of the transistor 44. The negative voltage transient across the zener diode 26 is transferred via the capacitor 42 and pulls the collector of the transistor 36 to a more negative voltage. This negative voltage transient is transferred to the base of the transistor 44 by the capacitor 54, as a result of which the last-mentioned transistor becomes non-conductive. As a result, the collector voltage of the transistor 44 rises and the transistor 36 is driven into conduction. The high collector voltage of the transistor 44 is transferred to the gate of the MOSFET 18 by the transistor 56, as a result of which the MOSFET is turned on. The conduction states of the transistors 36 and 44 change over very rapidly as a result of positive feedback. The changed-over situation is maintained until the capacitor 54 has been charged so far via the resistor 48 that the transistor 44 is turned on again and the transistor 36 is turned off again. The collector voltage of the transistor 44 becomes low again and the MOSFET 18 is turned off again. The attendant voltage transient on the node 20 has no effect on the one-shot OS because the amplitude of this voltage transient is too small to turn off the transistor 44. The diode 40 prevents the collector of the transistor 36 from reaching a voltage above the supply voltage Vcc in the case of positive voltage transients on the node 20 at the end of the off period $t_o$ when the diode 16 cuts off.

Figure 5:
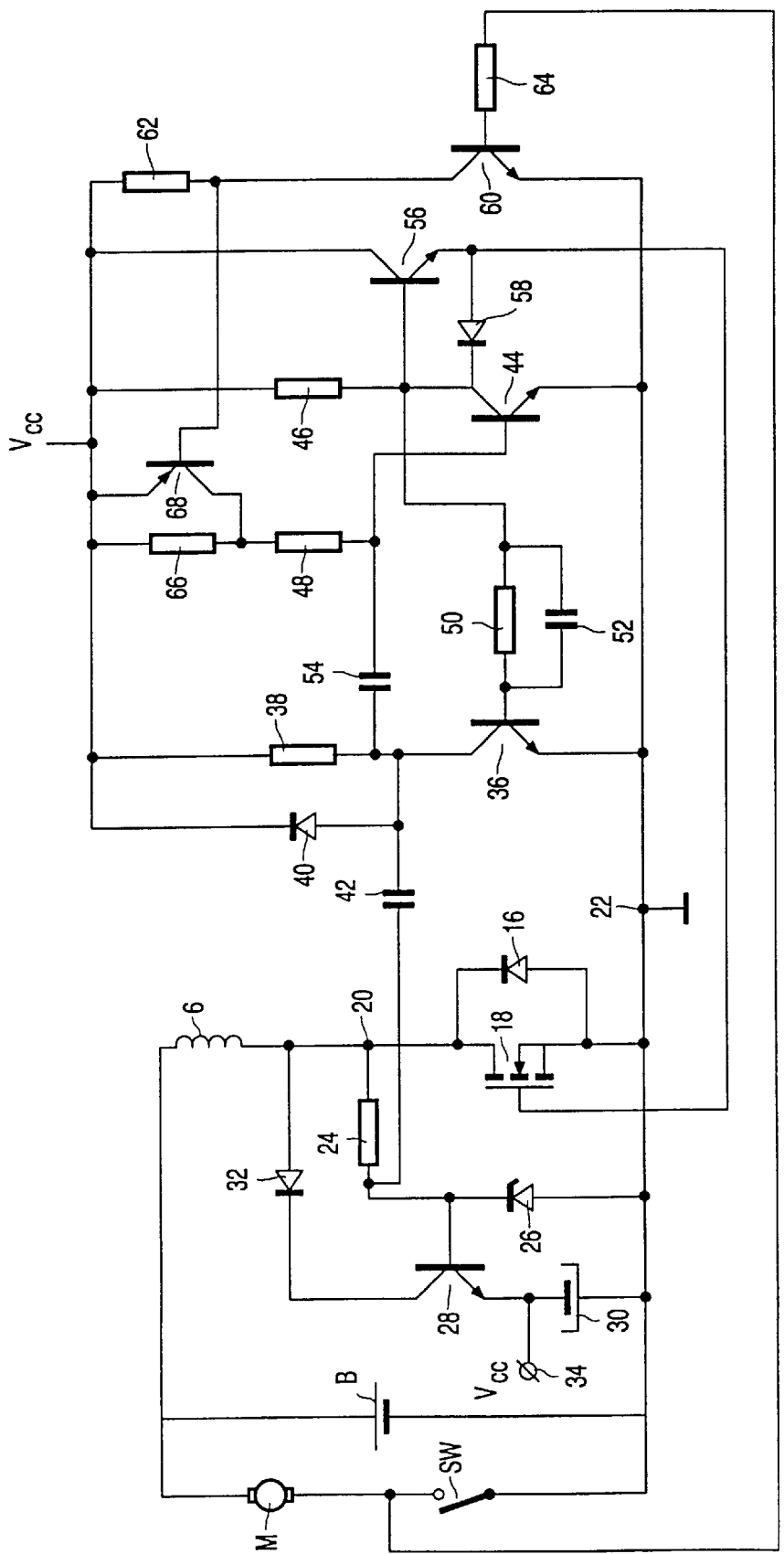
FIG. 5 shows a part of a circuit diagram of a rechargeable electric shaver including a switched-mode power supply in accordance with the invention.

FIG. 5 shows the circuit of FIG. 4 used in a shaver having a rechargeable battery. The circuit is largely identical to that of FIG. 4. A motor M and a switch SW have been added, which are connected in series across the battery B, the motor M being connected to the positive terminal of the battery B and the switch SW being connected to the negative terminal of the battery B and thus to ground 22. Moreover, an NPN transistor 60 has been added, whose emitter is connected to ground 22, whose collector is connected to the supply terminal 34 via a resistor 62 and whose base is connected to the node between the switch SW and the motor M via a resistor 64. Furthermore, a resistor 66 is arranged in series with the resistor 48 and is shunted by a PNP transistor having its emitter connected to the supply terminal 34 and having its base connected to the collector of the transistor 60. When the switch SW is open and the motor M does not rotate the motor M together with the resistor 64 functions as a pull-up resistance for the base of the transistor 60. The transistor 60 is then conductive, as a result of which the PNP transistor 68 is also conductive and the resistor 66 is short-circuited. The one-shot OS now has a small time constant and the fixed activation time $t_f$ of the MOSFET 18 is comparatively short. When the switch SW is closed and the motor M rotates the transistors 60 and 68 are both non-conductive and the resistor 66 is not short-circuited. The one-shot OS then has a large time constant and the fixed activation time $t_f$ of the MOSFET 18 is comparatively long. This is in order to allow for different off periods $t_o$ under different operating conditions of the power supply, i.e. the motor M turned on or the motor M turned off.

Figure 6:
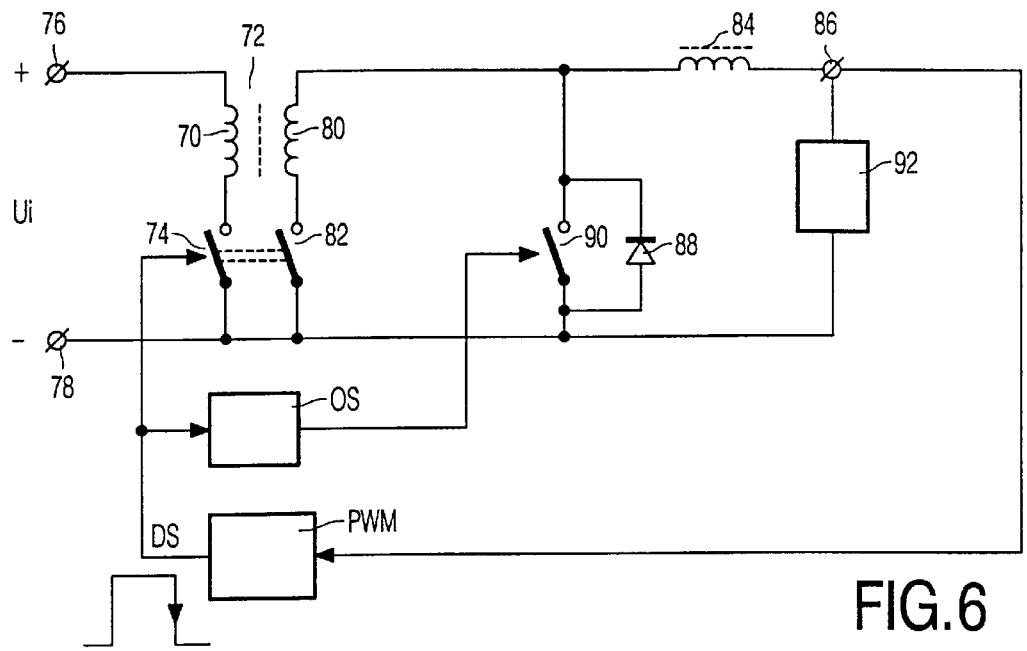
FIG. 6 shows an embodiment of a switched-mode power supply with synchronous rectification in accordance with the invention.

The synchronous rectification with fixed-time control is not limited to the configuration shown in FIG. 1 but can be applied to any configuration using synchronous rectifiers, comprising a diode and an electronic switch arranged in parallel therewith, and can be used in forward, flyback and buck-boost configurations with or without isolating transformer. By way of illustration FIG. 6 shows a forward converter with a transformer. A transformer 72 has its primary winding 70 connected to a positive supply terminal 76 and a negative supply terminal 78, to which an input voltage Ui is applied, via an electronic switch 74, the electronic switch 74 being connected between the primary winding 70 and the negative supply terminal 78. A secondary winding 80 of the transformer 72 has one end connected to the negative supply terminal 78 via an electronic switch 82, its other end being coupled to a terminal 86 via an inductive element 84. The other end of the secondary winding 80 is further connected to the negative supply terminal 78 via a diode 88 and an electronic switch 90 arranged in parallel with this diode. A load 92 to be powered is connected to the terminal 86 and the negative supply terminal 78. The voltage across the load 92 is applied to a pulse-width modulator PWM which simultaneously turns on and turns off the electronic switches 74 and 82 by means of a control signal DS. The trailing edge of the control signal DS triggers a one-shot OS which drives the electronic switch 90 into conduction in a manner similar to that used in the circuit of FIG. 4.

Figure 7:
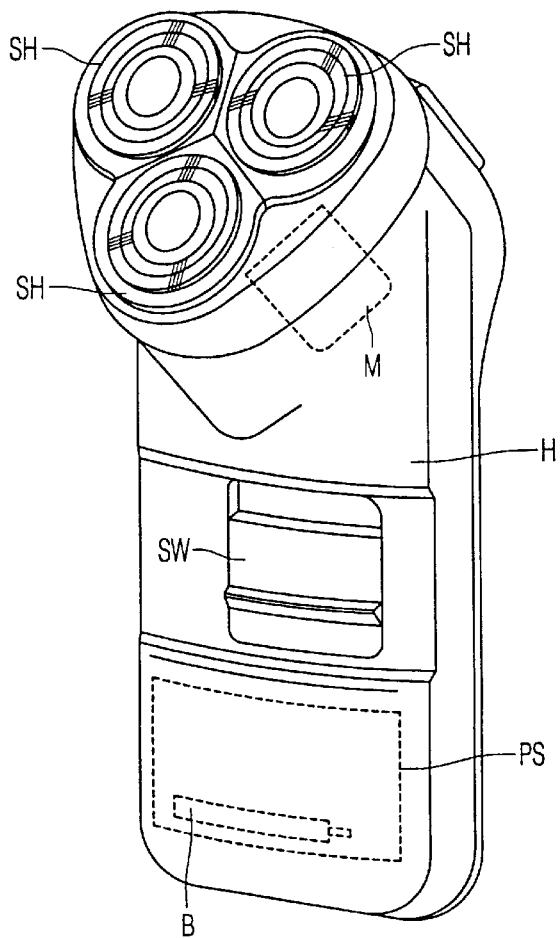
FIG. 7 shows a rechargeable shaver including a switched-mode power supply in accordance with the invention.

The power supply circuit in accordance with the invention is suitable for electrical appliances having rechargeable batteries, for example NiCd or NIMH batteries, which are charged from the mains voltage. FIG. 7 by way of example shows an electric shaver having a housing H, which accommodates the power supply circuit, referenced PS, the rechargeable battery B and the motor M. The motor drives the shaver heads SH and is actuated by means of the switch SW.

We claim:
1. A switched-mode power supply, comprising:
an inductive element;
a first electronic switch coupled to the inductive element to produce current flow therein during an on period in which the first electronic switch is conductive;
a parallel combination of a diode and a second electronic switch also coupled to the inductive element to produce current flow in the inductive element during an off period in which the first electronic switch is non-conductive, said current flow being in parallel in electrically consistent directions through said diode and the second electronic switch; and
means (OS) for turning off the second electronic switch after a fixed activation interval following commencement of said off period, said activation interval having a length somewhat smaller than but otherwise independent of the length of said off period.

2. A switched-mode power supply as claimed in claim 9, characterized in that the means for turning off the second electronic switch comprise a one-shot oscillator circuit (OS) which is triggered by a signal indicative of the end of said on period.

3. A switched-mode power supply as claimed in claim 2, in the form of a flyback converter which comprises: a transformer having a primary winding (4) connected in series with the first electronic switch (8) to a source of supply voltage, and a secondary winding (6) coupled to a load via said parallel arrangement (16, 18).

4. A switched-mode power supply as claimed in claim 3, further including means (66, 68) for adjusting the length of said fixed activation interval.

5. A switched-mode power as claimed in claim 4, wherein said load comprises a rechargeable battery (B) and means (SW) for connecting a power-consuming device (M) to the battery (B), the means (SW) also activating the means (66, 68) for adjusting the length of the fixed activation interval.

6. A switched-mode power supply as claimed in claim 2, characterized in that the one-shot oscillator circuit (OS) comprises:
a first transistor (36) and a second transistor (44) having first main electrodes coupled to a first supply terminal (22), having second main electrodes coupled to a second supply terminal (34) via a first resistor (38) and a second resistor (46), respectively, a control electrode of the first transistor (36) being coupled to the second main electrode of the second transistor (44) via a third resistor (50), and a control electrode of the second transistor (44) being connected to the second supply terminal (34) via a fourth resistor (48) and to the second main electrode of the first transistor (36) via a first capacitor (54), and a second capacitor (42) for coupling a trigger signal to the second main electrode of the first transistor (36).

7. A switched-mode power supply as claimed in claim 3, further comprising:
a resistor (24) for coupling a zener diode (26) to a node (20) between the secondary winding (6) and the parallel arrangement (16, 18), a transistor (28) having a control electrode coupled to the zener diode (26), having a first main electrode coupled to a buffer capacitor (30), and having a second main electrode coupled to the node (20) via a diode.

8. An electric shaving system comprising a shaver (H) which includes a rechargeable battery (B), an electrical load (M), a switch (SW) for connecting the motor (M) to the battery (B), and a switched-mode power supply (PS) as claimed in claim 9, for energizing at least the battery (B) and/or the motor (M).

* * * * *